US010878531B2

(12) United States Patent
Viet et al.

(10) Patent No.: US 10,878,531 B2
(45) Date of Patent: Dec. 29, 2020

(54) ROBOTIC PROCESS AUTOMATION

(71) Applicant: Accenture Global Solutions Limited, Dublin (IE)

(72) Inventors: Cuong Dinh Viet, Diemen (NL); Jeroen van den Heuvel, Barendrecht (NL); Pradyumna Moderahalli Krishna Prasad, Alkmaar (NL)

(73) Assignee: Accenture Global Solutions Limited, Dublin (IE)

( * ) Notice: Subject to any disclaimer, the term of this patent is extended or adjusted under 35 U.S.C. 154(b) by 264 days.

(21) Appl. No.: 15/998,853

(22) Filed: Aug. 17, 2018

(65) Prior Publication Data

US 2020/0059441 A1    Feb. 20, 2020

(51) Int. Cl.
  *G06T 3/40*  (2006.01)
  *G06T 7/90*  (2017.01)
  *G06F 9/451*  (2018.01)
  *G06F 16/51*  (2019.01)
  *G06K 9/62*  (2006.01)
  (Continued)

(52) U.S. Cl.
  CPC ............ *G06T 3/40* (2013.01); *B25J 9/163* (2013.01); *B25J 9/1697* (2013.01); *G06F 9/451* (2018.02); *G06F 16/51* (2019.01); *G06K 9/6215* (2013.01); *G06T 1/0014* (2013.01); *G06T 7/90* (2017.01);
  (Continued)

(58) Field of Classification Search
  CPC .................................. G06T 7/90; G06F 9/451
  See application file for complete search history.

(56) References Cited

U.S. PATENT DOCUMENTS 8,504,803 B2    8/2013  Shukla
8,793,578 B2 *  7/2014  Mounty .............. G06F 11/3688
                                                      715/704
(Continued)

FOREIGN PATENT DOCUMENTS

EP          3364299        8/2018

OTHER PUBLICATIONS

Hurst, Amy "Automatically Identifying Targets Users Interact with During Real World Tasks" International Conference on Intelligent User Interfaces. 2010. (Year: 2010).*

(Continued)

*Primary Examiner* — Kim Y Vu
*Assistant Examiner* — Molly Delaney
(74) *Attorney, Agent, or Firm* — Fish & Richardson P.C.

(57) ABSTRACT

Methods, systems, and apparatus, including computer programs encoded on computer storage media, for creating user interface control images for robotic automation. One of the methods includes detecting, during a training process, a control selection event; retrieving a first image and a second image; determining a difference image that represents a difference between the first image and the second image; determining, using the difference image, a plurality of colors for pixels included in the difference image that are likely located outside of a control location for the control; determining one or more shapes depicted in the difference image that each have a color other than all of the colors in the plurality of colors; selecting, from the one or more shapes and using an event location, a particular shape as likely representing the control; and storing a cropped image of the control extracted from one of the two or more images.

22 Claims, 3 Drawing Sheets

(51) Int. Cl.
*G06T 1/00* (2006.01)
*B25J 9/16* (2006.01)

(52) U.S. Cl.
CPC .............................. *G06T 2200/24* (2013.01); *G06T 2207/10024* (2013.01); *G06T 2207/20081* (2013.01)

(56) References Cited

U.S. PATENT DOCUMENTS

| | | | |
|---|---|---|---|
| 9,135,714 B1* | 9/2015 | Gauf | G06F 3/00 |
| 9,373,057 B1 | 6/2016 | Erhan et al. | |
| 9,462,042 B2 | 10/2016 | Shukla et al. | |
| 9,555,544 B2 | 1/2017 | Bataller et al. | |
| 9,954,819 B2 | 4/2018 | Kakhandiki et al. | |
| 10,235,192 B2* | 3/2019 | Hall | G06N 20/00 |
| 10,616,280 B2* | 4/2020 | Purushothaman | H04L 63/1408 |
| 2010/0295805 A1* | 11/2010 | Shin | G06F 3/04883 |
| | | | 345/173 |
| 2013/0019170 A1* | 1/2013 | Mounty | G06F 11/3688 |
| | | | 715/704 |
| 2015/0012919 A1 | 1/2015 | Moss et al. | |
| 2016/0019049 A1 | 1/2016 | Kakhandiki et al. | |
| 2016/0078368 A1 | 3/2016 | Kakhandiki et al. | |
| 2017/0001308 A1* | 1/2017 | Bataller | G06F 3/0484 |
| 2017/0017393 A1* | 1/2017 | Luo | G06F 3/04845 |
| 2017/0060108 A1 | 3/2017 | Kakhandiki et al. | |
| 2018/0004823 A1 | 1/2018 | Kakhandiki et al. | |
| 2018/0367483 A1* | 12/2018 | Rodriguez | H04L 51/046 |
| 2020/0103980 A1* | 4/2020 | Katz | G06F 3/013 |
| 2020/0184278 A1* | 6/2020 | Zadeh | G06F 16/953 |

OTHER PUBLICATIONS

EP Search Report in European Application No. EP19187735, dated Jan. 24, 2020, 10 pages.

* cited by examiner

ROBOTIC PROCESS AUTOMATION

TECHNICAL FIELD

This disclosure generally relates to robotic process automation.

BACKGROUND

Manual processes performed on a computer may be repetitive and time consuming. For example, a user may send e-mails in response to web form submissions, and for each web form submission, may need to manually interact with a computer to click buttons to open a window for composing a new e-mail, click buttons to copy information from the web form submission into the window, click keys to write text for a body of the e-mail, and click buttons to send the e-mail.

SUMMARY

In some implementations, a robotic training system can use computer vision and user interface component analysis to identify a user interface control, e.g., icon, selected during a process that the robotic training system is automating. The robotic training system can analyze differences between multiple images of a user interface to determine similarities and differences among them, e.g., between at least two of the images. The robotic training system can use the differences, and a control selection location, to determine an image of a control in the user interface that was selected.

For instance, the differences may indicate changes in a control's color before and after selection. The robotic training system may determine the location of a selected control using information for the color change. The robotic training system can use the determined location to isolate which control was selected, e.g., by a user. The robotic training system can extract, from one of the multiple images, a representation of the control for use creating an automation script for the process.

In general, one innovative aspect of the subject matter described in this specification can be embodied in methods that include the actions of detecting, during a robotic training process, a control selection event that identifies selection of a control depicted on a display of a computer; retrieving, from a memory, a first image and a second image that each i) depict a portion of the display and ii) were captured within a threshold period of time from when the control selection event occurred; determining a difference image that represents a difference between the first image and the second image; in response to determining the difference image that represents a difference between the first image and the second image, determining, using the difference image and an event location for the control selection event, a plurality of colors for pixels included in the difference image that are likely located outside of a control location for the control; in response to determining the plurality of colors, determining, using the difference image, one or more shapes depicted in difference image that each have a color other than all of the colors in the plurality of colors for pixels included in the difference image that are likely located outside of the control location; in response to determining the one or more shapes, selecting, from the one or more shapes and using the event location, a particular shape as likely representing the control; and storing, in a database, a cropped image of the control extracted from one of the two or more images using the particular shape. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Retrieving, from the memory, the first image and the second image may include retrieving, from the memory, three or more images that each i) depict the portion of the display and ii) were captured within the threshold period of time from when the control selection event occurred, the three or more images including the first image and two or more second images that include the second image. Determining the difference image that represents a difference between the first image and the second image may include generating, for each of the two or more second images, a respective difference image that represents a difference between the respective second image and the first image; and selecting, as the difference image, the image from the two or more difference images that represents a greatest variation between the first image and the two or more second images. Retrieving, from the memory, the three or more images may include determining, from a plurality of images, the three or more images that we each captured within one second of a time at which the control selection event occurred; and in response to determining the three or more images that were each captured within one second of the time at which the control selection event occurred, retrieving the determined three or more images from the memory. Retrieving, from the memory, the three or more images may include selecting the three or more images that each depict content on the display around the event location. Selecting, as the difference image, the image from the two or more difference images that represents a greatest variation between the first image and the two or more second images may include selecting, as the difference image, the image from the two or more difference images that has a greatest quantity of pixels that represent differences in corresponding pixels from the first image and the respective image from the two or more second images.

In some implementations, determining, using the difference image and the event location for the control selection event, the plurality of colors for pixels included in the difference image that are likely located outside of a control location for the control may include determining the plurality of colors using colors depicted in a pixel column and a pixel row that each a) include pixels from the difference image and b) intersect the event location. Determining the plurality of colors using the colors depicted in the pixel column and the pixel row may include selecting, as the plurality of colors, the colors that (a) occur in both the pixel column and the pixel row, and (b) occur more than a threshold quantity of times. Determining, using the difference image and the event location for the control selection event, the plurality of colors for pixels included in the difference image that are likely located outside of a control location for the control may include determining a contour in the difference image centered on the event location; and determining, as the plurality of colors, colors for each of a plurality of pixels included in an outer edge of the contour. The contour may be a circle, a triangle, or a rectangle.

In some implementations, determining the difference image that represents the difference between the current image and the other image may include determining the difference image that depicts only a portion of display. Determining the difference image that depicts only the portion of the display may include determining the difference image with a size of 200 pixels by 200 pixels. Determining the one or more shapes may include generating, using the difference image, a binary image that depicts (i) a first color at each pixel location that has one of the plurality of colors at a corresponding location in the difference image and (i) a second color at each remaining pixel locations that does not have one of the plurality of colors at a corresponding location in the difference image; and using, as the one or more shapes, one or more second pixel groups that each include, as pixels for the respective group, only connected pixels with the second color that each (a) are adjacent to another pixel with the second color or (b) connect to another pixel with the second color through a path of one or more pixels with the second color. Determining the difference image may include generating a gray scale difference image that represents a difference between the first image and the second image. Determining, using the difference image, the plurality of colors may include determining, using the gray scale difference image, the plurality of colors in a gray scale. Selecting the particular shape as likely representing the control may include determining second shapes from the one or more shapes that with an outside border that surrounds the event location; and selecting, as the particular shape, the second shape that has a smallest defined area from all of the second shapes. Selecting the particular shape as likely representing the control may include determining a bounding box that surrounds the particular shape in the difference image; and creating, from the first image or the second image, the cropped image using a location for the bounding box.

In some implementations, the first image and the second image can be screenshots of the display. The first image and the second image may include only a portion of the corresponding screenshot of the display. The method may include capturing a first screenshot concurrently with the control selection event; and capturing a second screenshot prior to or after the control selection event, the first image being one of the first screenshot or the second screenshot and the second image being the other of the first screenshot or the second screenshot. Detecting the control selection event may include detecting one of a primary button selection, a secondary button selection, a single tap touch-pad event, a double tap touch-pad event, or a control selection event concurrently with a keyboard event. Storing, in the database, the cropped image may include generating a computer script that defines one or more operations for another system to perform during a robotic automated process and includes, for one of the operations, a reference to the cropped image to enable the other system to identify the control using computer vision; and storing the computer script. The method may include providing the computer script and the cropped image of the control to the other system to cause the other system to perform the robotic automated process, automatically without human intervention, including selection of the control using the cropped image.

The subject matter described in this specification can be implemented in various embodiments and may result in one or more of the following advantages. In some implementations, the systems and methods described in this document may increase robotic automation robustness. For example, a robotic automation system may have improved robustness for a software application when background content, surrounding a button used in an automated process for the software application, is different during recording, e.g., creation of a computer script, and replay, e.g., runtime use of the computer script. In some examples, a robotic automation system may have improved robustness for a software application when recording and replay are performed on two different devices. In some implementations, the systems and methods described in this document may create more accurate icon images for robotic automation processes by using differences between images, e.g., screenshots, to detect a location of a selected icon. For instance, identification of background colors separate from other colors depicted in a difference image may improve system accuracy for detecting a selected icon. By storing a closely cropped depiction of the selected icon, the systems and methods described in this document may reduce memory storage requirements, network bandwidth requirements, e.g., used to send icon image data to a runtime robotic system, or both, compared to other systems. For instance, a robotic training system may reduce memory requirements for a training process by not storing, in a database, content depicted outside of the icon in an image for the icon. A robotic system, during runtime, may have reduced memory requirements because of the smaller images that depict only the icon. In some implementations, a robotic system, during runtime, uses a smaller amount of computer resources because it needs only compare an actual icon identified by a script with icons included in a user interface, and does not need to try to compare any content adjacent to the icon that would require additional analysis and additional resources. This may also improve the accuracy of the runtime robotic system. In some implementations, use of a closely cropped depiction of a selected icon may enable a runtime system to use a third party optical character recognition ("OCR") library; may enable creation of more robust, higher quality, or both, runtime scripts that describe an action to be performed; or a combination of both of these. For instance, use of the methods and systems described in this document to create cropped icons may enable a runtime system to use a third party OCR library that was not developed specifically for an automated robotic system that selects user interface icons.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A robotic system can use, e.g., execute, a script that defines one or more operations to perform a corresponding process. The process may include interaction with one or more applications, including an application that includes selectable user interface icons. When the script defines operations for user interface interactions, the robotic system can use the script to compare images of user interface icons, referenced by the script, with icons included in a user interface generated by an application with which the robotic system is interacting to determine which icon to select.

Given the robotic system's reliance on the images of the user interface icons, a quality of the images may affect an accuracy of the robotic system in performing certain processes. For instance, if an image depicts the wrong icon, or content adjacent to the icon, the robotic system may have difficulty locating the icon within a user interface, selecting the icon, or both. For example, when an image depicts an icon and part of a menu adjacent to the icon, the robotic system may incorrectly select the part of the menu adjacent to the icon when attempting to perform a corresponding script operation, which may prevent the robotic system from performing a process defined by the script.

To improve the robotic system's accuracy, a robotic training system uses differences between images that depict the user interface to detect icon selection. The robotic training system can determine, using the differences, "background" colors that are likely to occur outside the icon. The robotic training system can analyze colors other than the background colors to detect shapes represented in the differences. The robotic training system selects the detected shape that encompasses a mouse event location, e.g., a mouse click location, as defining a location for a representation for the icon. The robotic training system uses an outside edge of the shape to locate a depiction of the icon in one of the images and creates a cropped image, which includes only content for the icon, using the outside edge of the shape.

The "background" colors can be colors that occur outside an area of a button that includes the icon, in an area of the button that surrounds the icon, or both. For instance, when a button includes a gray area that surrounds an icon for the button, and a user interface that includes the button is blue and white, the background colors can include gray, blue, and white, e.g., assuming that none of these colors is included in the icon. The area of the button that surrounds the icon can be a "button background" while the area outside of the button can be a "user interface background."

Figure 1:
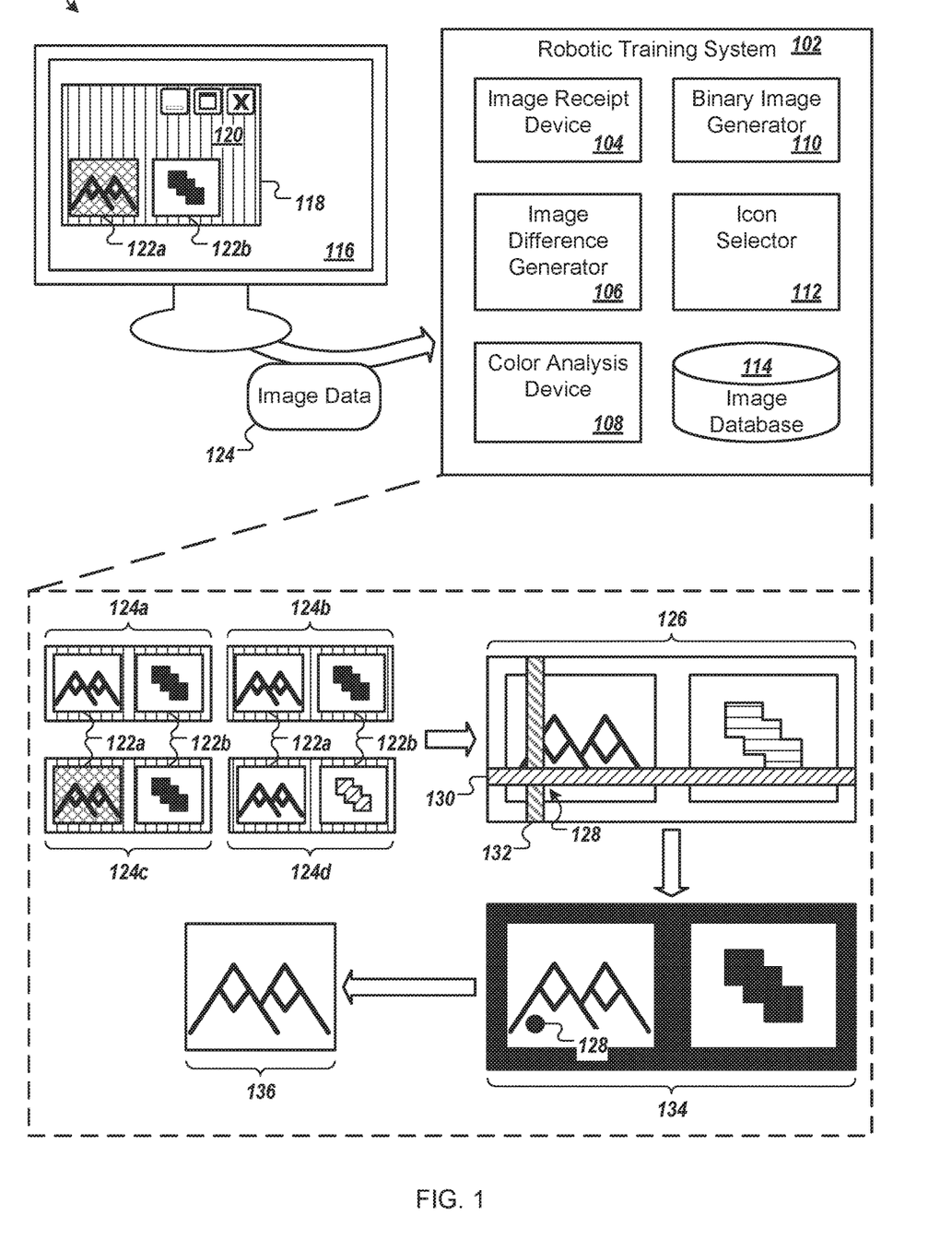
FIG. 1 depicts an example environment in which a robotic training system identifies a selected user interface icon for use in an automated robotic process.

FIG. 1 depicts an example environment 100 in which a robotic training system 102 identifies a selected user interface icon, e.g., from a group of multiple icons, for use in an automated robotic process. For example, the robotic training system 102 can analyze multiple images, e.g., screenshots, captured around a time when icon selection occurred, and determine differences in the images to locate a selected icon from a group of icons. The robotic training system 102 may use the selected icon when creating an automated process, e.g., a script that defines operations for a robotic system to perform.

The robotic training system 102 uses a change in the icon's appearance in one of the multiple images that is based on selection of the icon to detect the icon. For example, the robotic training system 102 uses the fact that the icon is highlighted when selected, or changes appearance after selection to indicate a setting change, or otherwise changes appearance to detect a location of the icon.

The robotic training system 102 may analyze multiple images around an icon selection event to identify differences between the images in an environment in which user interface windows, and icons presented in those windows, may move. For instance, analysis of multiple images within a predetermined period of time around an icon selection event may enable the robotic training system 102 to analyze multiple images that likely depict user interface windows in the same location. This may enable the robotic training system 102 to focus on the differences between the images that are likely to be caused by the icon selection event rather than another event, such as movement of a user interface window or other content that may appear on a display, e.g., included in or connected to a device 116.

The robotic training system 102 includes an image receipt device 104 that receives image data 124 from the device 116. The device 116 may be any appropriate type of computing device that generates a user interface. For example, the device 116 may be a personal computer, a mobile communication device, or another type of device that generates a user interface. The device 116 can include an integrated display, e.g., when the device 116 is a smartphone or an all-in-one computer, connect to an external display, or both.

The device 116 generates a user interface 118 that depicts a background 120 and multiple icons 122a-b. The user interface 118 is for an application for which the robotic training system 102 is generating an automation script. A robotic system can use the automation script to perform operations, defined in the script, to interact with the application, e.g., automatically without user input.

While the device 116 executes an application that presents the user interface 118, the device 116 may receive input that identifies selection of one or more of the icons 122a-b. The input may be any appropriate type of input, such as a mouse click event, a mouse hover event, e.g., over one of the icons, or touch input.

When the device 116 detects selection of one of the icons 122a-b, the device 116 performs a corresponding action defined for the selected icon. For example, when the selected icon defines operations for adjusting an image presented in the user interface 118, the device 116 performs the defined adjustment operations.

In response to icon selection, the device 116 provides data to the robotic training system 102. The data may include a location of the icon selection event, e.g., that identifies a location of a mouse cursor or a touch screen event. The data may include the image data 124 that includes data for the user interfaces, including the user interface 118, presented on the display. For example, the device 116 may provide image data 124 for any appropriate number of images, e.g., five, to the robotic training system 102. The device 116 may capture at least one of the images concurrently with the icon selection event, e.g., the "current image." The device 116 may capture some of the images prior to or after the icon selection event, e.g., "recent images."

The image data 124 may be any appropriate type of data that includes content for the user interfaces depicted on the display. For instance, the image data 124 may be a screenshot that depicts the content of the user interface 118, image data that contains the content of the user interface 118 and any adjacent user interfaces that border the user interface 118, a portion of a screenshot, or a combination of two or more of these. When the device 116 includes multiple, e.g., two, displays, the image data 124 may include data for all of the displays, one of the displays, e.g., on which the icon selection event occurred, or some other combination of displays.

In some implementations, the images represented by the image data 124 do not depict a cursor. For instance, the robotic training system 102 analyzes the images to determine a selected icon when none of the images includes a cursor that identifies the selected icon.

The device 116 can provide the image data 124 to the robotic training system 102 during any appropriate time period. For example, the device 116 may provide the image data 124 to the robotic training system 102 repeatedly, e.g., as a video stream with discrete frames. The device 116 may provide the image data 124 to the robotic training system 102 for a time period around when the icon selection event occurred. For instance, the device 116 may store, in a memory connected to the device 116, multiple images that depict the user interface 118. When the device 116 detects an icon selection event, the device 116 may retrieve, from the memory, data for images captured within a predetermined time of the icon selection event. The device 116 may retrieve images captured before the icon selection event, after the icon selection event, or both. The predetermined time may be one second or another appropriate time.

The image receipt device 104 may be any appropriate type of device that can capture, or receive, the image data 124. In implementations in which the robotic training system 102 includes the device 116, the image receipt device 104 may be implemented on the device 116. For instance, the image receipt device 104 can be part of a computer program, e.g., operating system, installed on the device 116 that captures the image data 124.

An image difference generator 106 receives the images 124a-d, e.g., the image data 124, from the image receipt device 104. The device 116 may capture a first image 124a and a second image 124b prior to the icon selection event. For instance, the first image 124a and the second image 124b may depict the first icon 122a and the second icon 122b both in an unselected state. The device 116 may capture a third image 124c during the time of the icon selection event, e.g., when a mouse hovered over or selected the first icon 122a or slightly after the beginning such an event. The third image 124c includes a changed depiction for the first icon 122a that represents the selection of the first icon 122a. For example, when the user interface 118 receives input indicating selection of the first icon 122a, the user interface 118, e.g., an application that generates the user interface 118, may cause a change in the presentation of the first icon 122a. The device 116 may capture a fourth image 124d after the icon selection event. In this example, the fourth image 124d depicts a slight variation in the second icon 122b. The variation may be caused by a mouse hover event occurring over the second icon 122b, a setting change cause by selection of the first icon 122 that causes a change in the appearance of the second icon, or by another computer event.

Although this example describes four images, the image difference generator 106 may receive, and analyze, data for any appropriate number of images. The device 116 should capture, and provide to the image receipt device 104, at least one image captured during the time period when the icon selection event occurs. For example, the device 116 may include more or fewer images before and after the icon selection event but should include the third image 124c captured during the icon selection event.

The image difference generator 106 analyzes the images 124a-d to determine differences between some of the images 124a-d. The image difference generator 106 may use any appropriate method to determine the differences between images. For example, the image difference generator 106 may compare one image, e.g., the third image 124c captured during the icon selection event, with each of the other images. The image difference generator 106 may perform a pixel-by-pixel comparison, a pixel block comparison, or another type of comparison. In some examples, the image difference generator 106 may subtract the values of one image from the values of another image to determine differences between two images.

The image difference generator 106 uses the differences between some of the images 124a-d to select two images that most differ. For instance, the image difference generator 106 may select the image captured during the icon selection event, e.g., the third image 124c, and another image that is most different from that image. The image difference generator 106 might not care about the types of differences between the images, but focus instead on the quantity of differences, size of differences, e.g., number of pixels that are different, or both.

In some examples, the image difference generator 106 may use a process based on pseudo code include in Table 1 below. In Table 1, the currentImage is the image captured concurrently with, e.g., during, the image capture event, e.g., the third image 124c. The recentImageList identifies the other images the image difference generator 106 analyzes, e.g., the images 124a-b and 124d. The recentImageList may include pointers to the respective images, or the data for the respective images. In some implementations, the recentImageList does not include the currentImage. In some implementations, the recentImageList includes the currentImage.

The histogram function can be a pixel-by-pixel algebraic difference operation between the currentImage an image from the recentImageList. For example, the histogram function can determine which color occurs most frequently in a difference between the two input images. In some examples, the histogram function can determine the most frequent color other than black, e.g., which represents no difference between the two images. This frequent color can be the button background, e.g., since only the color of the button area surrounding the icon should have changed between the currentImage and an image from the recentImageList. The sum function can then determine the number of pixels in the difference image that have this frequent color by summing the image pixels of this color.

TABLE 1

Pseudo Code for Difference Image Generation

```
GetBestDiffImage(recentImageList, currentImage){
    bgPixelsMax = 0, bgPixelsMaxImageIndex = −1;
    for each (recentImage in recentImageList at index i){
        int totalBackgroundPixels =
Sum(histogram(diffImage(recentImageList[i], currentScreenshot)));
        if (totalBackgroundPixels > bgPixelsMax){
            bgPixelsMax = totalBackgroundPixels;
            bgPixelsMaxImageIndex = i;
        } }
    return
    currentImage.AbsDiff(recentImageList[bgPixelsMaxImageIndex]);
}
```

The image difference generator 106 creates a difference image 126 that indicates the differences between two of the images 124a-d. For instance, the image difference generator 106 determines two images from the images 124a-d for which there is the greatest variation between the two images. The image difference generator 106 may determine the two images that include, as one of the two images, an image captured during the icon selection event, e.g., the third image 124c. In some examples, when the image difference generator 106 subtracts the values of one image from another, the image difference generator 106 may use the resultant values as the values for the difference image 126. For instance, the image difference generator 106 may use the absolute difference between the image captured during the icon selection event and the other image most different from that image to generate the difference image 126.

The image difference generator 106 may create the difference images before or after selecting the two images that most differ. For instance, the image difference generator 106 may create multiple difference images and then use the pseudo code in Table 1 to select one of the difference images, e.g., to select the best difference image. In some examples, the image difference generator 106 may select the two images that most differ and then create a difference image using the two selected images.

In some implementations, the image difference generator 106 may use a color analysis device 108 during creation of the difference image 126. For example, the color analysis device 108 can determine a quantity of pixels depicted in some of the images 124a-d with a color that occurs at least a threshold amount in the respective image, in some of the images 124a-d, or in all of the images 124a-d. The image difference generator 106 may use the quantity of pixels with a color that occurs at least a threshold amount to select the other image for use with the image captured during the icon selection event when creating the difference image 126. As shown above in Table 1, the image difference generator 106 can use an image from the images 124a-d with a highest quantity of pixels that have colors that occur at least a threshold amount to generate the difference image. In some examples, the image difference generator 106 may perform this analysis.

The color analysis device 108 receives the difference image 126 from the image difference generator 106 and analyzes the difference image 126 to determine one or more colors depicted in the difference image 126 and a quantity of occurrences of those colors. For example, the color analysis device 108 can determine an event location 128 at which the icon was selected, e.g., a location of a mouse pointer or a touch screen event when the icon was selected. The color analysis device 108 can determine a row 130 and a column 132 in the difference image 126 that intersect with the event location 128. The row 130, the column 132, or both, can have a dimension of one pixel across the corresponding length or a dimension of multiple pixels across the corresponding length.

The color analysis device 108 may use any appropriate contour to determine one or more colors depicted in the difference image. The color analysis device 108 can use, as the contour, a circle, a triangle, or a rectangle, e.g., a square. The contour may be centered on the event location 128.

The color analysis device 108 determines one or more colors from the difference image 126 using the event location 128. For instance, the color analysis device 108 determines the colors that occur in the row 130 and the column 132. The color analysis device 108 may determine a quantity of times that each of the determined colors occur in the row 130, the column 132, or both. The color analysis device 108 may determine the colors that occur in the row 130, the column 132, or both, more than a threshold amount. The color analysis device 108 may analyze only the colors depicted in the row 130 and the column 132 to reduce the amount of necessary processing of the difference image 126, e.g., so that the color analysis device 108 does not have to analyze the entire difference image 126.

The color analysis device 108 may perform this processing of the difference image 126 to determine pixels in the difference image 126 that are not likely part of the selected icon. For example, the difference image 126 may have large pixel portions surrounding the icons 122a-b that each have a single color because the content depicted in those portions is the same in both images used to create the difference image 126. When content depicted in the same location of the two images is the same, the difference image 126 is likely to have a single color represent that content, e.g., black given a difference of zero between those portions of the two images. In some implementations, there may be color variations between the two images in portions of the user interface, or other portions of the images 124a-d, that do not depict the icon. Given that the size of the selected icons is generally small, the color analysis device 108 may adjust colors that frequently occur in the difference image 126 to account for these color variations and enable the robotic training system 102 to more easily identify shapes depicted in the difference image 126. The color analysis device 108 may perform this adjustment by determining the threshold amount using a size or predicted size for the icons 122a-b.

The color analysis device 108 may select the threshold amount based on a size of the icons 122a-b. For instance, the color analysis device 108 may select a predetermined threshold amount. The color analysis device 108 may predict a likely icon size with which to determine the threshold amount such that at least some colors, or all colors, used to depict the first icon 122a in the difference image 126 have a lower likelihood of being determined.

The robotic training system 102 may use any appropriate type of color scale. For example, when the robotic training system 102 uses 8-bit color graphics, the color analysis device 108 can use 256 entry arrays to identify which colors occur more than the threshold amount. Each entry in the array may represent whether the corresponding color occurs at least a threshold amount. For instance, a first entry may indicate a quantity of occurrences of the color; whether the quantity of occurrences satisfies, e.g., is greater than or equal to or either, the threshold amount; or both.

In some implementations, the color analysis device 108 may use a process based on the pseudo code included in Table 2 below to determine the colors. In Table 2, the arrays include 256 locations based on an 8-bit color scale. The color analysis device 108 may use any appropriate color scale, array sizes, or both. In Table 2, diffImage is the difference image 126, and eventLocation is the event location 128 at which the icon selection event occurred, e.g., a mouse click location. The color analysis device 108 may determine the colors that occur in both the row 130 and the column 132 by determining the product of columnHistogram and rowHistogram. In some examples, the color analysis device 108 may normalize the productHistogram to indicate whether the corresponding values satisfy the threshold amount, e.g., with a value of "one" indicating that the quantity of the corresponding color satisfies the threshold amount and a value of "zero" indicating that the quantity of the corresponding color does not satisfy the threshold amount.

TABLE 2

Pseudo Code for Selection of Colors to Remove

```
CreateColorList(diffImage, eventLocation){
    columnHistogram = int[256] such that columnHistogram[i] = the
number of times color i appears in the column that intersects with
eventLocation;
```

TABLE 2-continued

Pseudo Code for Selection of Colors to Remove

```
    rowHistogram = int[256] such that rowHistogram[i] = the number
of times color i appears in the row that intersects with eventLocation;
    productHistogram = int[256] such that productHistogram[i] =
rowHistogram[i] * columnHistogram[i];
    return productHistogram;
}
```

A binary image generator 110 receives data identifying the determined colors from the color analysis device 108. The binary image generator 110 uses the determined colors to detect shapes depicted in the difference image 126. For instance, the binary image generator 110 may remove the determined colors from the difference image 126 to create a binary image 134. The binary image generator 110 may change any of the determined colors in the difference image 126 to a value of "one" and any other colors in the difference image to a value of "zero" when creating the binary image 134. The binary image 134 includes only black and white pixels, in contrast to the difference image that may include any color in a color scale, e.g., an 8-bit gray color scale. This conversion may enable the robotic training system to better identify clusters of pixels that represent shapes depicted in the difference image 126. An example of pseudo code for a process that can be performed by the binary image generator 110 is included in Table 3 below.

TABLE 3

Pseudo Code for Shape Detection

```
CreateBinaryShapes(diffImage, productHistogram) {
    indexRange = lowest index of productHistogram where
productHistogram[index] > thresholdAmount to highest index;
    croppedImage = createImage(diffImage | each pixel is 1 if its color is
within range, 0 otherwise);
    return croppedImage;
}
```

In some examples, the binary image generator 110 may crop a size of the difference image to remove areas of the difference image 126 that include only the predetermined colors. For example, the binary image generator 110 may determine that the difference image 126 includes an upper half that only depicts some of the determined colors. The binary image generator 110 may remove the upper half of the difference image 126 when creating the binary image 134. The difference image 126, or a cropped version of the difference image 126, may have a size of 200 pixels by 200 pixels. In some examples, another component of the robotic training system 102 may crop the difference image 126 or create a smaller version of the difference image 126.

An icon selector 112 receives the binary image 134 from the binary image generator 110. The icon selector 112 analyzes the binary image 134 to select a shape that surrounds the event location 128. For instance, the icon selector 112 may determine that the binary image 134 includes four objects: a first black outline of two mountains, a first white area surrounding the two mountains, a second black shape that includes three connected boxes, and a second white area that surrounds the second black shape. The icon selector 112 may analyze one or more of the four shapes to determine which shapes surround the event location 128. The icon selector 112 may determine that the second black shape and the second white area do not surround the event location 128. The icon selector 112 may determine that the first white area completely surrounds the event location 128, e.g., because the first white area borders the event location 128 on all sides. In some examples, the icon selector 112 may determine that a space defined by the first black outline, e.g., a bounding box, surrounds the event location 128 because a lower portion of the space defined by the first black outline extends below the event location 128 and the first black outline borders the event location 128 on the other three sides. Depending on the implementation, the icon selector 112 may determine that either the first black outline or the first white area enclose the event location and select the corresponding shape.

Table 4, below, depicts example pseudo code for a process that can be performed by the icon selector 112. In Table 4, a ConnectedComponent is a shape defined by a set of connected pixels. ccList is a list, e.g., array, of Connected-Components. The process described in Table 4 returns the bestCc (best ConnectedComponent) for which a bounding box, that surrounds the ConnectedComponent, includes the event location 128. In Table 4, the process selects the ConnectedComponent with the highest number of pixels, e.g., the first white area described above. In some examples, a process may select a ConnectedComponent with a lowest number of pixels. The process may exclude, from the list of ConnectedComponents, a background section that surrounds the icons 122a-b, e.g., that is greater than a threshold size.

TABLE 4

Pseudo Code for Shape Selection

```
IconDetection(croppedImage, eventLocation){
    List<ConnectedComponent> ccList = all sets of pixels, such that
the pixels in the set are of the same color and there exists a path from and
to each pixel where each pixel on the path is the same color
    for (each ConnectedComponent in ccList) {
        ConnectedComponent.BoundingBox = the smallest square that
surrounds the pixels of the connected component
        ConnectedComponent.Background = true if and only if the color
value is one (within range)
        ConnectedComponent.NumberOfPixels = number of pixels
included in ConnectedComponent.BoundingBox;
    }
    validCc = all ConnectedComponents cc from ccList where a)
cc.Background is one and b) cc.BoundingBox encompasses eventLocation;
    bestCc = the cc from validCc that has the highest cc.NumberOfPixels
    return bestCc;
}
```

The icon selector 112 determines a bounding box that surrounds the selected shape. The icon selector 112 uses a location of the bounding box to extract image content 136 from one of the images 124a-d. The extracted image content 136 depicts at least a portion of the selected first icon 122a.

The icon selector 112 may extract the image content 136 from one of the images 124a-d other than the third image 124c that depicts a changed first icon 122a. For instance, the icon selector 112 may extract the image content 136 from the other image used to generate the difference image 126, e.g., from the fourth image 124d, so that the extracted image content 136 does not include the changed appearance for the first icon 122a that was depicted in the third image 124c captured during the icon selection event.

The icon selector 112 can store the extracted image content 136 in an image database 114. For instance, the icon selector 112 provides data that represents the extracted image content 136 to the image database 114.

The robotic training system 102 can use the extracted image content 136 to create an automation script to enable a robotic system to interact with the user interface 118. For example, the robotic training system 102 may use a process as described in U.S. application Ser. No. 15/094,063, filed on Apr. 8, 2016 which issued as U.S. Pat. No. 9,555,544, on Jan. 31, 2017, the contents of which are incorporated by reference herein. The automation script may define one or more operations for the robotic system to perform to complete a task. The operations may reference the extracted image content 136 to enable the robotic system to determine an icon, depicted in the user interface 118, to select as part of the task. The automation script may include a reference to a location in the image database 114 at which the extracted image content 136 is stored. The automation script may include a copy of the extracted image content 136. The automation script may defines operations for the robotic system to perform automatically, without human intervention.

The robotic training system 102 may generate difference images, binary images, or both, using any appropriate color scale. For instance, the robotic training system 102 may generate difference images in gray scale, 8-bit color, or using another appropriate color scale. The robotic training system 102 may generate binary images using two predetermined colors, e.g., black and white or red and blue. In some examples, the robotic training system 102 may generate binary images that include more than two colors. For instance, the robotic training system 102 may generate a binary image with three colors, using multiple different threshold values. First pixels with a difference image color that satisfies a first threshold may be a first color, second pixels with a difference image color that satisfies a second threshold may be a second color, and any remaining pixels, e.g., that satisfy both thresholds, or are between the two thresholds, or that don't satisfy either threshold, may be a third color, different from the first color and the second color.

In some implementations, the robotic training system 102, e.g., the image difference generator 106, analyzes more than two images, e.g., three images 124a-c, four images 124a-d, or more images. The robotic training system 102 may analyze multiple images captured during a period of time when an icon selection event occurs. For instance, the device 116 may begin to capture the multiple images upon detecting the beginning of the icon selection event, e.g., a mouse click. The device 116 may continue to capture images while processing the icon selection event and performing operations in response to the icon selection event, e.g., during the icon selection event. When the icon selection event is the execution of an application, for example, the device 116 can begin to capture images upon receiving input indicating selection of the application's icon until a window for the application launches. This may enable the robotic training system 102 to analyze multiple images when a change in the icon's appearance might not occur immediately when the icon selection event begins and instead begins slightly afterward.

The robotic training system 102 may analyze a predetermined quantity of images for each icon selection event. For instance, the robotic training system 102 may analyze four images for each icon selection event.

In some implementations, the robotic training system 102 analyzes a dynamic quantity of images for an icon selection event. For instance, the robotic training system 102 may determine a quantity of images for an icon selection event dynamically based on a length of the icon selection event, a type of the icon selection event, or both. The robotic training system 102 may analyze more images for a touch input event than a mouse input event, e.g., because a touch input may typically have a longer duration than a mouse input.

The robotic training system 102 may analyze images captured any appropriate time period apart. Some of the images 124a-d may have the same time distance between the capture of subsequent images, e.g., 200 milliseconds. Some of the images 124a-d may have varying time distances between capture of subsequent images, e.g., 100 milliseconds between a first and a second image and 200 milliseconds between the second and a third image.

In some implementations, the robotic training system 102 may compare each image in a group of images with the other images in the group when determining two images in the group that most differ, when creating the difference image 126, or both. For instance, the robotic training system 102, e.g., the image difference generator 106, may compare the first image 124a with each of the second, third and fourth images 124b-d, compare the second image 124b with each of the third and fourth images 124c-d, and compare the third image 124c with the fourth image 124d. The robotic training system 102, e.g., the image difference generator 106, may use a result of the comparisons to determine the two images that most differ, to generate the difference image 126, or both.

The robotic training system 102 can include several different functional components, including the image receipt device 104, the image difference generator 106, the color analysis device 108, the binary image generator 110, the icon selector 112, and the image database 114. The various functional components of the robotic training system 102 may be installed on one or more computers as separate functional components or as different modules of a same functional component. For example, the image receipt device 104, the image difference generator 106, the color analysis device 108, the binary image generator 110, the icon selector 112, the image database 114, or any combination of two or more of these, can be implemented as computer programs installed on one or more computers in one or more locations that are coupled to each through a network. In cloud-based systems for example, these components can be implemented by individual computing nodes of a distributed computing system.

Figure 2:
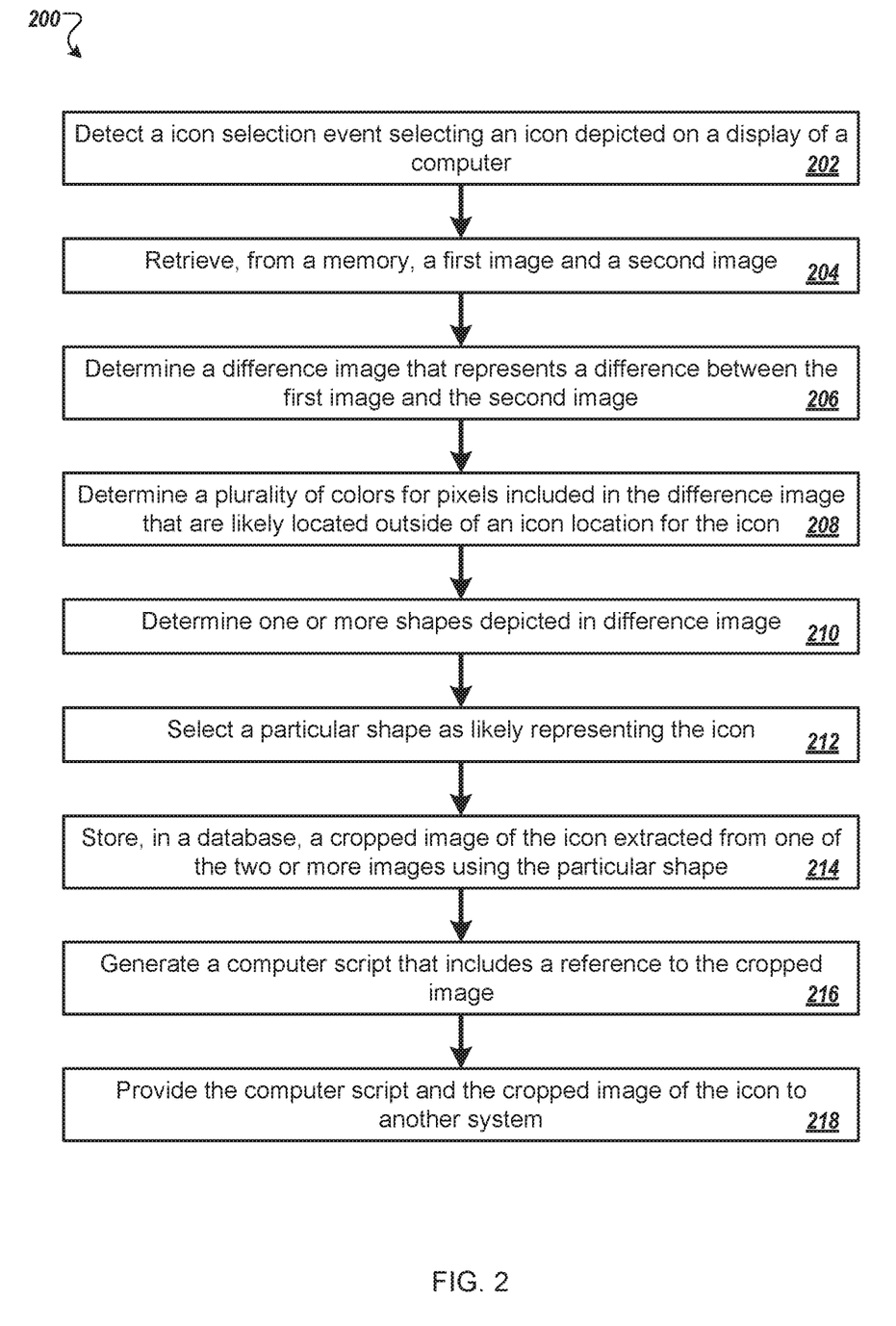
FIG. 2 is a flow diagram of a process for creating icon images for robotic process automation.

FIG. 2 is a flow diagram of a process 200 for creating icon images for robotic process automation. For example, the process 200 can be used by the robotic training system, or various components of that system, from the environment 100.

A robotic training system detects an icon selection event selecting an icon depicted on a display of a computer (202). The icon selection event may be any appropriate type of event, such as a mouse click selecting the icon, touch input selecting the icon, or another input.

In implementations in which the robotic training system executes on the same hardware as the application that presents the icon, e.g., on the computer, the robotic training system may receive the input from the input device, e.g., a mouse or a touch screen. In implementations in which the robotic training system executes on different hardware, the robotic training system may receive data for the icon selection event from the computer. The data for the icon selection event may be an input event location and image data, e.g., multiple screen shots.

The input event location may be any appropriate type of user interface coordinates. For instance, the input event location may indicate the pixel or pixels at which the input was received. The input event may be for multiple pixels when the input is a touch screen input. The input event may be a location defined with respect to a particular display, e.g., when the computer is connected to multiple displays.

The robotic training system retrieves, from a memory, a first image and a second image (204). For example, the robotic training system receives multiple images from the computer and stores the images in the memory. The robotic training system may retrieve data for the first image and the second image from the memory. The first image and the second image, and each of the multiple images, may have the same size. For instance, each of the multiple images may have a size defined by the display.

The robotic training system determines a difference image that represents a difference between the first image and the second image (206). The different image may be a gray scale image. The robotic training system may determine the different image using an absolution value of the differences between the colors at respective pixel locations in the first image and the second image.

In some implementations, the robotic training system can discard difference images with a difference value that satisfies a threshold difference value. For example, the robotic training system can determine a difference value that represents an amount of difference between the two images used to create the difference image. The robotic training system may calculate the difference value using a number of pixels that are different between the two images, color changes between the two images, e.g., an extent to which a pixel at a location changes color, another representation of difference, or a combination of two or more of these. The robotic training system can discard difference images with a difference value greater than, or equal to, or either, the threshold difference value. This process may enable the robotic training system to discard difference images that have a change in a window, or a window location, presented on a display of the computer.

The robotic training system determines a plurality of colors for pixels included in the difference image that are likely located outside of an icon location for the icon (208). For example, the robotic training system determines colors that have at least a threshold likelihood of being a color depicted in the first image, the second image, or both, at a location outside the icon location for the icon. The robotic training system may predict the icon location based on the icon selection event location, e.g., the location of the mouse or touch screen input. The robotic training system may determine the threshold likelihood, e.g., a threshold quantity of occurrences of a color, based on a predicted size for the icon, the size of the images, or both.

The robotic training system determines one or more shapes depicted in difference image (210). For instance, the robotic training system determines pixels with a color that are connected, directly or indirectly, to other pixels with the same color. The robotic training system may use, as the shapes, each group of pixels connected to other pixels with the same color. In some examples, the robotic training system may normalize the difference image, e.g., create a binary image, to determine the shapes depicted in the difference image.

The robotic training system selects a particular shape as likely representing the icon (212). For instance, the robotic training system may generate bounding boxes for each of the determined shapes. The bounding boxes can encompass the respective shape while including as few pixels as possible, e.g., the bounding box can include the pixels on the outer most edges of the respective shapes. The robotic training system can select, as the particular shape, the shape that has a bounding box that includes the icon selection event location.

The robotic training system may select the particular shape with a largest or a smallest bounding box that includes the icon selection event location. For instance, the robotic training system may select a largest shape that is likely to include more content from the selected icon without including content outside of the selected icon.

In some implementations, the robotic training system may discard data for particular shapes with a size that satisfies a threshold size, e.g., greater than or equal to or either, the threshold size. For example, the robotic training system can discard data for shapes with sizes that are greater than a likely icon size, e.g., a quarter or half the size of the screen depending on a screen time. The likely icon size may be different for a mobile device, such as a smart phone, compared to a computer with a generally larger screen, e.g., a desktop or a laptop.

The robotic training system stores, in a database, a cropped image of the icon extracted from one of the two or more images using the particular shape (214). For instance, the robotic training system uses the bounding box for the particular shape to create the cropped image of the icon. The robotic training system may use a location for the bounding box to extract pixels from one of the two or more images. The robotic training system can use the extracted pixels as the cropped image.

The robotic training system may store the cropped image in a database that includes other image data for other icons. For instance, the database may include multiple entries that identify image data for various icons used in robotic automation processes.

The database, or another database, may include computer automation scripts that define operations for robotic automation processes. Each of the scripts may reference, e.g., include or identify a pointer to, image data in the database. A robotic system can use the computer automation scripts, and the referenced image data, to perform an automated process, e.g., without receipt of human input.

The robotic training system generates a computer script that includes a reference to the cropped image (216). For example, the robotic training system may perform steps 202 through 214 for a step in a process that is being automated. The robotic training system may perform steps 202 through 214 for each of multiple steps in the process that is being automated. The computer script may define computer operations for each of the steps in the process that is being automated, including a reference to a cropped image that represents a respective icon for some of the steps. For instance, the computer script may include a reference to a respective icon for the steps in which a robotic system would need to select an icon in an application. When the robotic system executes the computer script and reaches a step that references an icon, the robotic system may compare a current user interface with the cropped image for the referenced icon. The robotic system can use machine vision to detect a location in the current user interface that depicts the referenced icon, e.g., by searching an image of the current user interface for a depiction of the referenced icon. The robotic system may use any appropriate method to detect the depiction of the referenced icon in the image of the current user interface.

The robotic training system may store the computer script in the database or in another database. For instance, the robotic training system may store the computer script in a database that includes entries for each of multiple computer scripts. The multiple computer scripts may be for different processes. Some of the multiple computer scripts may be for the same process, e.g., when a single process includes multiple steps, accesses multiple applications, or both.

The robotic training system provides the computer script and the cropped image of the icon to another system (218). For example, the robotic training system may provide the computer script and the cropped icon image to a robotic system for use executing the computer script to perform an automated process. The robotic system may execute the computer script automatically, e.g., without receipt of user input.

The order of steps in the process 200 described above is illustrative only, and creating icon images for robotic process automation can be performed in different orders. For example, the robotic training system may generate the computer script concurrently with detection of the icon selection event and storing the cropped image in the database.

In some implementations, the process 200 can include additional steps, fewer steps, or some of the steps can be divided into multiple steps. For example, the process 200 can include steps 204 through 214 without including the other steps. In some examples, a robotic training system may perform steps 202 through 214 for multiple steps in a process that is being automated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 3:
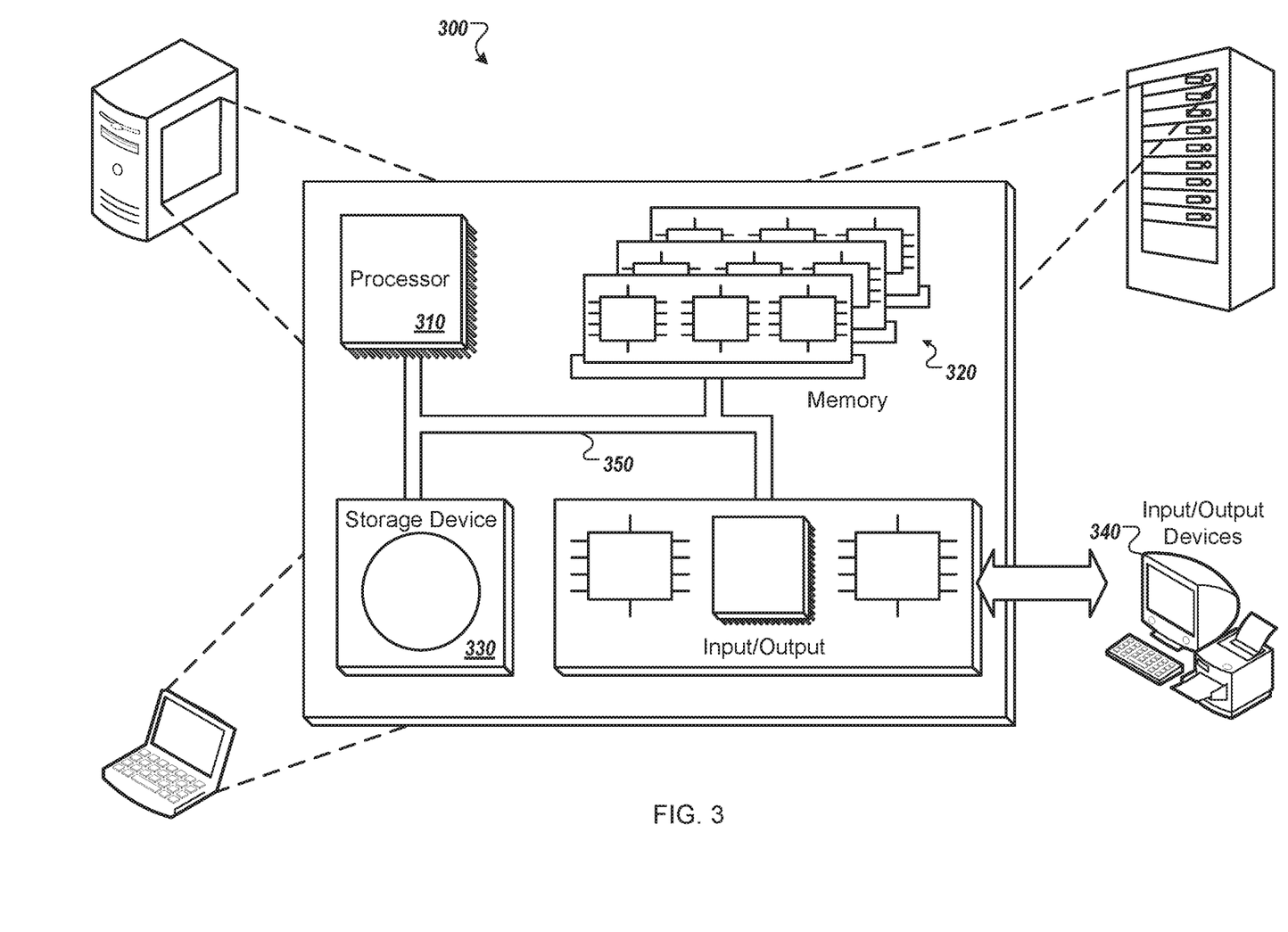
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:
   detecting, during a robotic training process, a control selection event that identifies selection of a control depicted on a display of a computer;
   retrieving, from a memory, a first image and a second image that each i) depict a portion of the display and ii) were captured within a threshold period of time from when the control selection event occurred;
   determining a difference image that represents a difference between the first image and the second image;
   in response to determining the difference image that represents a difference between the first image and the second image, determining, using the difference image and an event location for the control selection event, a plurality of colors for pixels included in the difference image that are likely located outside of a control location for the control, comprising determining the plurality of colors using colors depicted in a pixel column and a pixel row that each a) include pixels from the difference image and b) intersect the event location;
   in response to determining the plurality of colors, determining, using the difference image, one or more shapes depicted in difference image that each have a color other than all of the colors in the plurality of colors for pixels included in the difference image that are likely located outside of the control location;
   in response to determining the one or more shapes, selecting, from the one or more shapes and using the event location, a particular shape as likely representing the control; and storing, in a database, a cropped image of the control extracted from one of the two or more images using the particular shape.

2. The system of claim 1, wherein:
retrieving, from the memory, the first image and the second image comprises retrieving, from the memory, three or more images that each i) depict the portion of the display and ii) were captured within the threshold period of time from when the control selection event occurred, the three or more images including the first image and two or more second images that include the second image; and
determining the difference image that represents a difference between the first image and the second image comprises:
generating, for each of the two or more second images, a respective difference image that represents a difference between the respective second image and the first image; and
selecting, as the difference image, the image from the two or more difference images that represents a greatest variation between the first image and the two or more second images.

3. The system of claim 2, wherein retrieving, from the memory, the three or more images comprises:
determining, from a plurality of images, the three or more images that we each captured within one second of a time at which the control selection event occurred; and
in response to determining the three or more images that were each captured within one second of the time at which the control selection event occurred, retrieving the determined three or more images from the memory.

4. The system of claim 2, wherein retrieving, from the memory, the three or more images comprises selecting the three or more images that each depict content on the display around the event location.

5. The system of claim 2, wherein selecting, as the difference image, the image from the two or more difference images that represents a greatest variation between the first image and the two or more second images comprises selecting, as the difference image, the image from the two or more difference images that has a greatest quantity of pixels that represent differences in corresponding pixels from the first image and the respective image from the two or more second images.

6. The system of claim 1, wherein determining the plurality of colors using the colors depicted in the pixel column and the pixel row comprises selecting, as the plurality of colors, the colors that (a) occur in both the pixel column and the pixel row, and (b) occur more than a threshold quantity of times.

7. The system of claim 1, wherein determining, using the difference image and the event location for the control selection event, the plurality of colors for pixels included in the difference image that are likely located outside of a control location for the control comprises:
determining a contour in the difference image centered on the event location; and
determining, as the plurality of colors, colors for each of a plurality of pixels included in an outer edge of the contour.

8. The system of claim 7, wherein the contour comprises a circle, a triangle, or a rectangle.

9. The system of claim 1, wherein determining the difference image that represents the difference between the current image and the other image comprises determining the difference image that depicts only a portion of display.

10. The system of claim 9, wherein determining the difference image that depicts only the portion of the display comprises determining the difference image with a size of 200 pixels by 200 pixels.

11. The system of claim 1, wherein determining the one or more shapes comprises:
generating, using the difference image, a binary image that depicts (i) a first color at each pixel location that has one of the plurality of colors at a corresponding location in the difference image and (i) a second color at each remaining pixel locations that does not have one of the plurality of colors at a corresponding location in the difference image; and
using, as the one or more shapes, one or more second pixel groups that each include, as pixels for the respective group, only connected pixels with the second color that each (a) are adjacent to another pixel with the second color or (b) connect to another pixel with the second color through a path of one or more pixels with the second color.

12. The system of claim 1, wherein:
determining the difference image comprises generating a gray scale difference image that represents a difference between the first image and the second image; and
determining, using the difference image, the plurality of colors comprises determining, using the gray scale difference image, the plurality of colors in a gray scale.

13. The system of claim 1, wherein selecting the particular shape as likely representing the control comprises:
determining second shapes from the one or more shapes that with an outside border that surrounds the event location; and
selecting, as the particular shape, the second shape that has a smallest defined area from all of the second shapes.

14. The system of claim 1, wherein selecting the particular shape as likely representing the control comprises:
determining a bounding box that surrounds the particular shape in the difference image; and
creating, from the first image or the second image, the cropped image using a location for the bounding box.

15. The system of claim 1, wherein the first image and the second image are screenshots of the display.

16. The system of claim 15, wherein the first image and the second image comprise only a portion of the corresponding screenshot of the display.

17. The system of claim 15, the operations comprising:
capturing a first screenshot concurrently with the control selection event; and
capturing a second screenshot prior to or after the control selection event, the first image being one of the first screenshot or the second screenshot and the second image being the other of the first screenshot or the second screenshot.

18. The system of claim 1, wherein detecting the control selection event comprises detecting one of a primary button selection, a secondary button selection, a single tap touch-pad event, a double tap touch-pad event, or a control selection event concurrently with a keyboard event.

19. The system of claim 1, wherein storing, in the database, the cropped image comprises:
generating a computer script that defines one or more operations for another system to perform during a robotic automated process and includes, for one of the operations, a reference to the cropped image to enable the other system to identify the control using computer vision; and
storing the computer script.

20. The system of claim 19, the operations comprising:
providing the computer script and the cropped image of the control to the other system to cause the other system to perform the robotic automated process, automatically without human intervention, including selection of the control using the cropped image.

21. A non-transitory computer storage medium encoded with instructions that, when executed by one or more computers, cause the one or more computers to perform operations comprising:
- detecting, during a robotic training process, a control selection event that identifies selection of a control depicted on a display of a computer;
- retrieving, from a memory, a first image and a second image that each i) depict a portion of the display and ii) were captured within a threshold period of time from when the control selection event occurred;
- determining a difference image that represents a difference between the first image and the second image;
- in response to determining the difference image that represents a difference between the first image and the second image, determining, using the difference image and an event location for the control selection event, a plurality of colors for pixels included in the difference image that are likely located outside of a control location for the control, comprising determining the plurality of colors using colors depicted in a pixel column and a pixel row that each a) include pixels from the difference image and b) intersect the event location;
- in response to determining the plurality of colors, determining, using the difference image, one or more shapes depicted in difference image that each have a color other than all of the colors in the plurality of colors for pixels included in the difference image that are likely located outside of the control location;
- in response to determining the one or more shapes, selecting, from the one or more shapes and using the event location, a particular shape as likely representing the control; and
- storing, in a database, a cropped image of the control extracted from one of the two or more images using the particular shape.

22. A computer-implemented method comprising:
- detecting, during a robotic training process, a control selection event that identifies selection of a control depicted on a display of a computer;
- retrieving, from a memory, a first image and a second image that each i) depict a portion of the display and ii) were captured within a threshold period of time from when the control selection event occurred;
- determining a difference image that represents a difference between the first image and the second image;
- in response to determining the difference image that represents a difference between the first image and the second image, determining, using the difference image and an event location for the control selection event, a plurality of colors for pixels included in the difference image that are likely located outside of a control location for the control, comprising determining the plurality of colors using colors depicted in a pixel column and a pixel row that each a) include pixels from the difference image and b) intersect the event location;
- in response to determining the plurality of colors, determining, using the difference image, one or more shapes depicted in difference image that each have a color other than all of the colors in the plurality of colors for pixels included in the difference image that are likely located outside of the control location;
- in response to determining the one or more shapes, selecting, from the one or more shapes and using the event location, a particular shape as likely representing the control; and
- storing, in a database, a cropped image of the control extracted from one of the two or more images using the particular shape.

* * * * *